(12) United States Patent
Yang et al.

(10) Patent No.: US 10,017,064 B1
(45) Date of Patent: Jul. 10, 2018

(54) ISOLATED HIGH PRECISION PILOT VOLTAGE GENERATING CIRCUIT AND ELECTRIC VEHICLE SUPPLY EQUIPMENT INCLUDING THE SAME

(71) Applicant: Eaton Corporation, Cleveland, OH (US)

(72) Inventors: Andrew Yang, Shanghai (CN); Tom Xiong, Shanghai (CN); Kevin Zhong, Shanghai (CN); Alex Zhuang, Shanghai (CN); Martin Chen, Shanghai (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 34 days.

(21) Appl. No.: 15/384,553

(22) Filed: Dec. 20, 2016

(51) Int. Cl.
*B60L 11/18* (2006.01)

(52) U.S. Cl.
CPC ....... *B60L 11/1824* (2013.01); *B60L 11/1838* (2013.01)

(58) Field of Classification Search
CPC .................. B60L 11/1824; B60L 11/1138
USPC ........................................................ 320/109
See application file for complete search history.

(56) References Cited

U.S. PATENT DOCUMENTS

| | | | | |
|---|---|---|---|---|
| 6,819,412 B2* | 11/2004 | Glingener | ............ | G01M 11/319 356/73.1 |
| 8,378,628 B2* | 2/2013 | Ichikawa | ............. | B60L 3/0069 320/109 |
| 8,749,198 B2* | 6/2014 | Klesyk | .................. | G06F 1/263 320/108 |
| 8,768,563 B2* | 7/2014 | Nitzberg | ................. | G07C 3/00 701/31.6 |
| 8,779,719 B2* | 7/2014 | Matsuki | ............... | B60L 3/0023 180/65.21 |
| 9,073,446 B2* | 7/2015 | Hani | ..................... | B60L 3/0069 |
| 9,293,251 B2* | 3/2016 | Irie | ..................... | H04B 5/0037 |
| 9,671,466 B2* | 6/2017 | Murahari | ........... | G01R 31/3275 |
| 9,729,986 B2* | 8/2017 | Crawley | ............. | H04R 29/001 |
| 9,804,034 B2* | 10/2017 | Jefferies | ................. | G01K 13/00 |
| 2004/0264094 A1* | 12/2004 | Rahman | ............... | H02H 7/0455 361/115 |
| 2013/0134938 A1* | 5/2013 | Bianco | ..................... | H02J 7/00 320/109 |
| 2014/0002020 A1* | 1/2014 | Geber | ................. | B60L 11/1818 320/109 |
| 2014/0239894 A1* | 8/2014 | Mitsutani | .................. | H02J 7/04 320/109 |
| 2014/0266040 A1* | 9/2014 | Hassan-Ali | ......... | B60L 11/1818 320/109 |

(Continued)

*Primary Examiner* — M'Baye Diao
(74) *Attorney, Agent, or Firm* — Eckert Seamans

(57) ABSTRACT

An electrical circuit for electric vehicle supply equipment including a pilot control signal unit structured to generate a pilot control signal having a state including one of a high state and a low state, a pilot control signal isolation unit structured to generate an isolated pilot control signal that is isolated from the power lines of the electric vehicle supply equipment and is based on the state of the pilot control signal, and an amplification unit structured to generate a pilot signal based on the state of the pilot control signal. The amplification unit is structured to receive the isolated pilot control signal and the isolated voltage and to use the isolated pilot control signal and the isolated voltage to generate the pilot signal, and the pilot signal is isolated from the power lines of the electric vehicle supply equipment.

21 Claims, 3 Drawing Sheets

(56) References Cited

U.S. PATENT DOCUMENTS

| | | | |
|---|---|---|---|
| 2015/0097525 A1* | 4/2015 | Dedona | B60L 11/1838 320/109 |
| 2016/0138980 A1* | 5/2016 | Jefferies | B60L 11/1816 374/141 |
| 2016/0159231 A1* | 6/2016 | Jefferies | B60L 11/1838 320/109 |

* cited by examiner

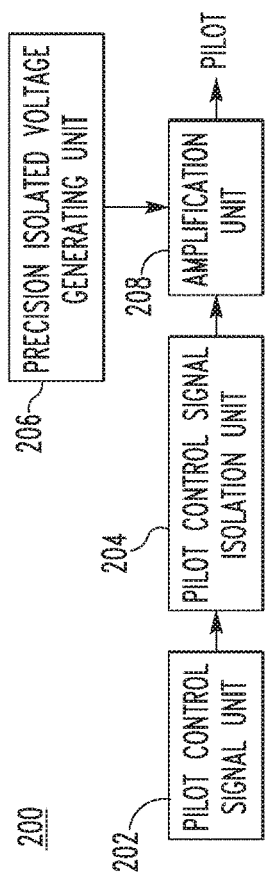
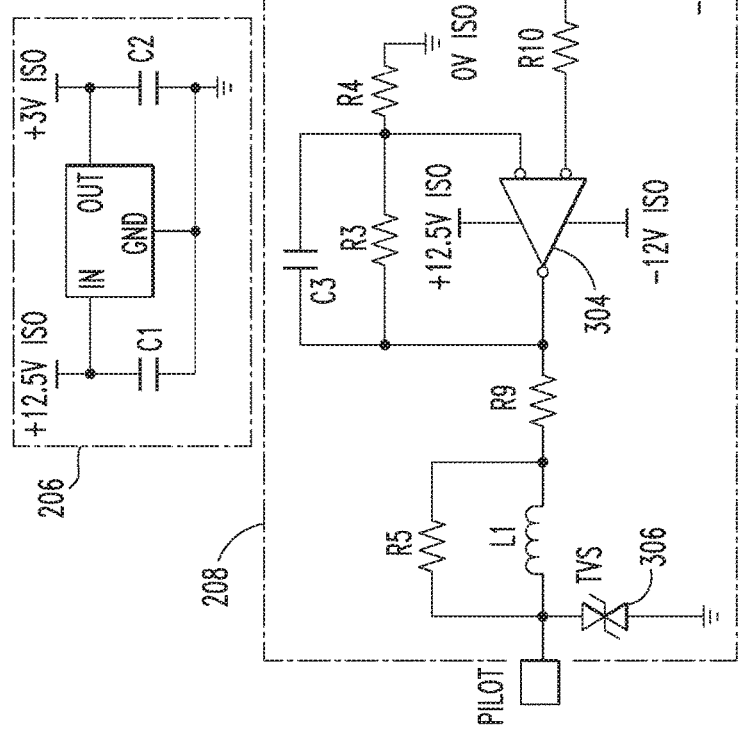

ISOLATED HIGH PRECISION PILOT VOLTAGE GENERATING CIRCUIT AND ELECTRIC VEHICLE SUPPLY EQUIPMENT INCLUDING THE SAME

BACKGROUND

Field

The disclosed concept pertains generally to electric vehicle supply equipment and, more particularly, to an isolated high precision pilot voltage generating circuit for electric vehicle supply equipment.

Background Information

An electric vehicle (EV) charging station, also called an EV charging station, electric recharging point, charging point, and EVSE (Electric Vehicle Supply Equipment), is an element in an infrastructure that supplies electric energy for the recharging of electric vehicles, plug-in hybrid electric-gasoline vehicles, or semi-static and mobile electrical units such as exhibition stands.

An EV charging station is a device that safely allows electricity to flow. These charging stations and the protocols established to create them are known as EVSE, and they enhance safety by enabling two-way communication between the charging station and the electric vehicle.

The 1996 NEC and California Article 625 define EVSE as being the conductors, including the ungrounded, grounded, and equipment grounding conductors, the electric vehicle connectors, attachment plugs, and all other fittings, devices, power outlets or apparatus installed specifically for the purpose of delivering energy from premises wiring to an electric vehicle.

EVSE is defined by the Society of Automotive Engineers (SAE) recommended practice J1772 and the National Fire Protection Association (NFPA) National Electric Code (NEC) Article 625. While the NEC defines several safety requirements, J1772 defines the physical conductive connection type, five pin functions (i.e., two power pins (Hot1 and Hot2 or neutral; or Line 1 and Line 2), one ground pin 3, one control pilot pin 4, and one proximity pin 5), the EVSE to EV handshake over the pilot pin 4, and how both parts (EVSE and EV) are supposed to function. FIG. 1 is a block diagram in schematic form of a charging system 100 compliant with the J1772 standard.

Two-way communication seeks to ensure that the current passed to the EV is both below the limits of the EV charging station itself and below the limits of what the EV can receive. There are additional safety features, such as a safety lock-out that does not allow current to flow from the EV charging station until the EV connector or EV plug is physically inserted into the EV and the EV is ready to accept energy.

J1772 in North America and IEC 61851 standard use a very simple but effective pilot circuit and handshake in the EVSE. For charging a vehicle using alternating current (AC), the control electronics 22 generate a 12 Vdc pilot voltage. The 12 Vdc pilot voltage is provided to the pilot pin 4 of FIG. 1. When the EVSE cable and connector 10 is plugged into an EV inlet 11 of a compliant vehicle 12, the vehicle's circuit has a resistor 14 and a diode 16 in series that ties to ground 18 in order to drop the 12 Vdc to 9 Vdc. After the EVSE 20 sees this drop in voltage, it turns on a pulse-width modulated (PWM) generator in control electronics 22 that defines the maximum available line current (ALC) on the charging circuit. The vehicle charge controller 24 reads the percentage of the duty cycle of the PWM signal, which is equivalent to a certain amperage, and sets the maximum current draw on the onboard vehicle rectifier/charger 26, in order to not trip an upstream circuit interrupter (not shown). The vehicle 12, in turn, adds another resistor 28 in parallel with the resistor 14 of the vehicle's resistor and diode 14,16 series combination, which then drops the top level of the PWM pilot signal to 6 Vdc. This tells the EVSE 20 that the vehicle 12 is ready to charge. In response, the EVSE 20 closes an internal relay/contactor 30 to allow AC power to flow to the vehicle 12.

The contactor 30 includes a first set of contacts 32 and a second set of contacts 34. The EVSE 20 includes a first differential amplifier circuit 40 that is electrically connected to a line side output of the first set of contacts 32 via a first connection 44 and to a load side output of the first set of contacts 32 via a second connection 46. The EVSE 20 also includes a second differential amplifier circuit 42 that is electrically connected to a line side output of the second set of contacts 34 via a third connection 48 and to a load side output of the second set of contacts 34 via a fourth connection 50. The first differential amplifier circuit 40 amplifies a difference in voltage between the line side output and the load side output of the first set of contacts 32 and the second differential amplifier circuit 42 amplifies a difference in voltage between the line side output and the load side output of the second set of contacts 34 and outputs the amplified voltage differences to the control electronics 22.

The control electronics 22 determine, from the amplified voltage differences received from the first and second differential amplifier circuits 40,42, whether the first and/or second sets of contacts 32,34 are open or closed. For example, when there is little or no difference in the voltages between the line and load side outputs of one of the set of contacts 32,34, it is an indication that the set of contacts is closed.

One issue with the charging system 100 of FIG. 1 is that the control electronics cannot generate a high precision 12V pilot voltage. Another issue with the charging system 100 of FIG. 1 is that the control electronics 22 cannot withstand a 6 kV surge voltage.

There is room for improvement in EVSE including, for example, circuitry for generating a pilot signal.

SUMMARY

These needs and others are met by embodiments of the disclosed concept in which a pilot signal generating circuit is capable of producing a high precision 12V pilot signal.

In accordance with aspects of the disclosed concept, an electrical circuit for electric vehicle supply equipment comprises: a power supply unit structured to generate an isolated voltage that is isolated from power lines of the electric vehicle supply equipment; a pilot control signal unit structured to generate a pilot control signal having a state including one of a high state and a low state; a pilot control signal isolation unit structured to generate an isolated pilot control signal that is isolated from the power lines of the electric vehicle supply equipment and is based on the state of the pilot control signal; and an amplification unit structured to generate a pilot signal based on the state of the pilot control signal. The amplification unit is structured to receive the isolated pilot control signal and the isolated voltage and to use the isolated pilot control signal and the isolated voltage to generate the pilot signal, and wherein the pilot signal is isolated from the power lines of the electric vehicle supply equipment.

In accordance with other aspects of the disclosed concept, electric vehicle supply equipment comprises: power lines structured to carry power to charge an electric vehicle; and a pilot signal generating circuit including: a power supply unit structured to generate an isolated voltage that is isolated from the power lines; a pilot control signal unit structured to generate a pilot control signal having a state including one of a high state and a low state; a pilot control signal isolation unit structured to generate an isolated pilot control signal that is isolated from the power lines and is based on the state of the pilot control signal; and an amplification unit structured to generate a pilot signal based on the state of the pilot control signal. The amplification unit is structured to receive the isolated pilot control signal and the isolated voltage and to use the isolated pilot control signal and the isolated voltage to generate the pilot signal, and wherein the pilot signal is isolated from the power lines.

BRIEF DESCRIPTION OF THE DRAWINGS

A full understanding of the disclosed concept can be gained from the following description of the preferred embodiments when read in conjunction with the accompanying drawings in which:

FIG. 2 is a block diagram in schematic form of a pilot signal generating circuit in accordance with an example embodiment of the disclosed concept;

FIG. 3 is a circuit diagram of a pilot signal generating circuit in accordance with an example embodiment of the disclosed concept.

DESCRIPTION OF THE PREFERRED
EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "isolated" shall mean using one or more circuit elements (e.g., without limitation, a transistor, an operational amplifier, an optocoupler etc.) to electrically isolate two parts of a circuit from each other.

Figure 1:
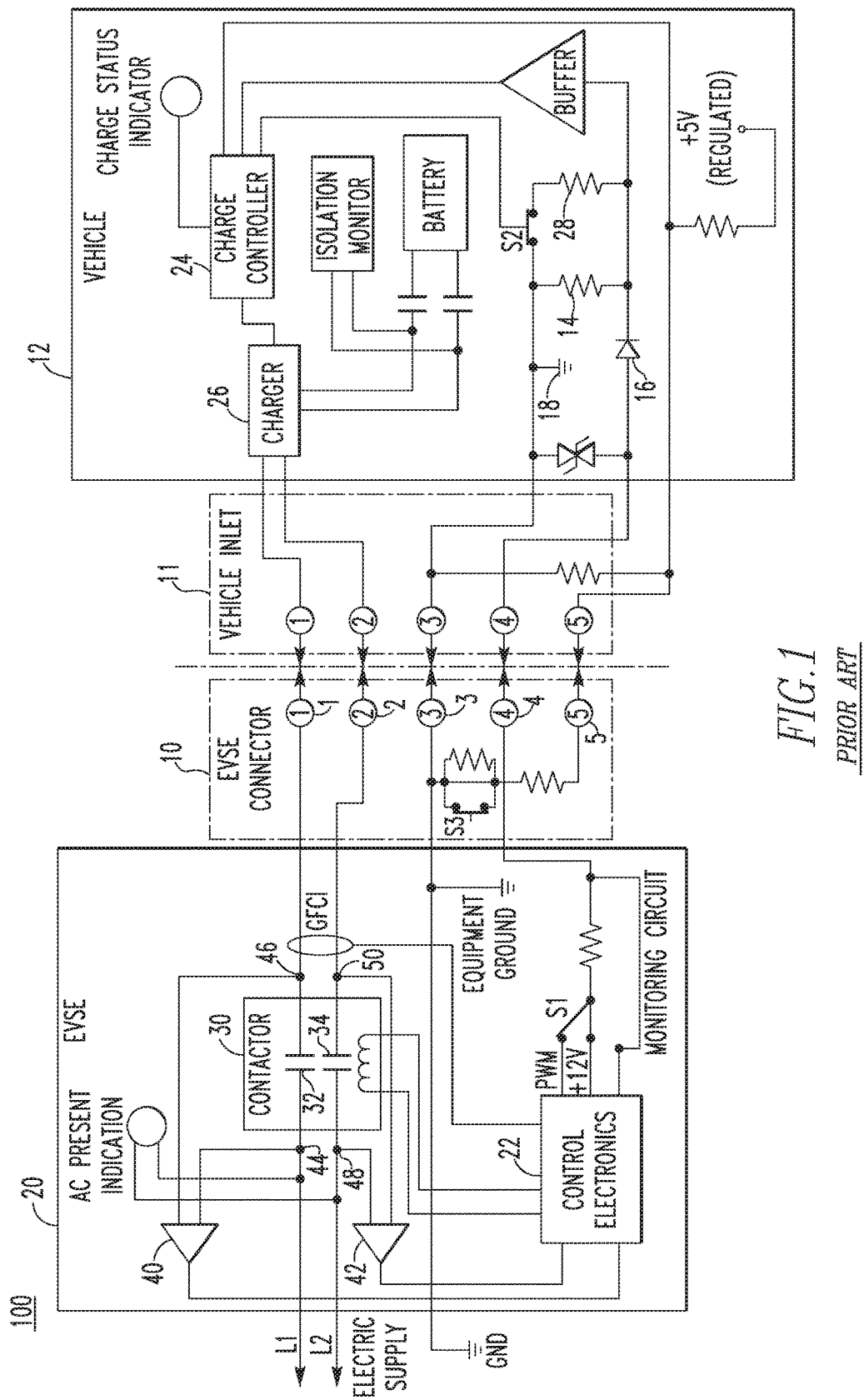
FIG. 1 is a block diagram in schematic form of an electric vehicle supply equipment (EVSE) to electric vehicle (EV) system.

As employed herein, the term "power lines of the electric vehicle supply equipment" or "power lines of the EVSE" shall mean the conductors in EVSE that carry the power that is used to charge an EV. For example, the conductors that carry the Line 1 and Line 2 power through the EVSE 100 to the EVSE connector 10 in FIG. 1 are the power lines of the EVSE 100.

As employed herein, the term "high precision" shall mean a tolerance of no greater than +/−0.1%. For example a high precision 3V supplied voltage is within +/−0.1% of 3V, whereas a regular 3V supplied voltage is within +/−1% of 3V. Similarly, a high precision resistor has a resistance within +/−0.1% of its labeled resistance.

FIG. 2 is a block diagram in schematic form of a pilot signal generating circuit 200 in accordance with an example embodiment of the disclosed concept. The pilot signal generating circuit 200 includes a pilot control signal unit 202, a pilot control signal isolation unit 204, a precision isolated voltage generating unit 206, and an amplification unit 208. The pilot signal generating circuit 200 may be employed in EVSE. For example, the pilot signal generating circuit 200 may be employed in control electronics 22' of EVSE 100' (see FIG. 4).

The pilot control signal unit 202 is structured to generate a pilot control signal. The pilot control signal is not isolated with respect to the power lines of EVSE. The power lines are the conductors that carry power to charge the EV. For example, referring to FIG. 4, the power lines of EVSE 100' are the conductors that carry the Line 1 and Line 2 power through the EVSE 100' to the EVSE connector 10. In some example embodiments of the disclosed concept, the pilot control signal may have an associated state and the pilot control signal unit 202 may control the state of the pilot control signal. For example and without limitation, the pilot control signal may have a "HIGH" and a "LOW" state. The states of the pilot control signal may have associated voltages. For example and without limitation, when the pilot control signal is in the "LOW" state, it may have a voltage of 0V, and when the pilot control signal is in the "HIGH" state, it may a voltage of 5V. However, it will be appreciated by those having ordinary skill in the art that any voltages may be associated with the states of the pilot control signal without departing from the scope of the disclosed concept.

The pilot control signal unit 202 may be formed of any electronic components capable of generating a voltage signal. For example and without limitation, in some example embodiments of the disclosed concept, the pilot control signal unit 202 may be a processor structured to output the pilot control signal and control the state of the pilot control signal.

The pilot control signal unit 202 is electrically connected to the pilot control signal isolation unit 204 and outputs the pilot control signal to the pilot control signal isolation unit 204. The pilot control signal isolation unit 204 is structured to generate an isolated pilot control signal that is isolated from the power lines of the EVSE and is based on the state of the pilot control signal. For example, the isolated pilot control signal changes when the state of the pilot control signal changes. In some example embodiments of the disclosed concept, the pilot control signal isolation unit 204 uses an optocoupler to provide isolation for the isolated pilot control signal. However, it will be appreciated by those having ordinary skill in the art that the pilot control signal isolation unit 204 may use other mechanisms for providing isolation without departing from the scope of the disclosed concept. In some example embodiments of the disclosed concept, the pilot control signal isolate unit 204 provides at least 6 kV of surge protection between the isolated pilot control signal and the power lines of the EVSE. For example, the optocoupler may provide at least 6 kV of surge protection between the isolated pilot control signal and the power lines of the EVSE.

The precision isolated voltage generating unit 206 is a power supply unit that is structured to generate an isolated voltage. The isolated voltage is isolated from the power lines of the EVSE. In some example embodiments of the disclosed concept, the precision isolated voltage generating unit 206 generates an isolated voltage of about 3V that is isolated from the power lines. The isolated voltage generated by the precision isolated voltage generating unit 206 is also a high precision voltage (i.e. within +/−0.1% of 3V). A regular 3V supplied voltage, on the other hand, has a tolerance of +/−1%.

The precision isolated voltage generating unit 206 is electrically connected to the amplification unit 208 and provides the precision isolated voltage it generates to the amplification unit 208. The pilot control signal isolation unit 204 is also electrically connected to the amplification unit 208 and provides the isolated pilot control signal to the amplification unit 208. The amplification unit 208 is structured to generate a pilot signal based on the state of the pilot control signal. The amplification unit 208 uses the precision isolated voltage and the isolated pilot control signal to generate the pilot signal. The pilot signal is isolated from the power lines of the EVSE. In some example embodiments of the disclosed concept, the voltage of the pilot signal is based on the state of the pilot control signal. In some example embodiments of the disclosed concept, the amplification unit 208 outputs the pilot signal as 12V when the state of the pilot control signal is "HIGH" and outputs the pilot signal as −12V when the state of the pilot control signal is "LOW". In some example embodiments of the disclosed concept, the 12V pilot signal output by the amplification unit 208 is a high precision voltage (i.e. within +/−0.1% of 12V).

FIG. 3 is a circuit diagram of the pilot signal generating circuit 200 of FIG. 2 in accordance with an example embodiment of the disclosed concept. As shown in FIG. 3, the pilot control signal generating unit 202 is electrically connected to the pilot control signal isolation unit 204 and provides the pilot control signal to the pilot control signal isolation unit 204. The pilot control isolation unit 204 includes a switch 300 and an optocoupler 302. In some example embodiments of the disclosed concept, the switch 300 is a transistor. The pilot control isolation unit 204 also includes resistors R1, R2, R6, and R7.

In some example embodiments of the disclosed concept, the switch 300 is a transistor have a base, common, and emitter connection, as is shown in FIG. 3. The resistor R2 is electrically connected between the input of the pilot control isolation unit 204 (i.e., the input where the pilot control signal is received) and the base connection of the switch 300. The resistor R1 is electrically connected between the base connection and the emitter connection of the switch 300. The emitter connection of the switch 300 is also electrically connected to a voltage source (e.g., without limitation, 3.3V). The resistors R6 and R7 are electrically connected in parallel with each other between the common connection of the switch 300 and an input to the optocoupler 302. In some example embodiments of the disclosed concept, the optocoupler 302 is capable of providing at least 6 kV of surge protection between its input and its output and is thereby capable of providing 6 kV of surge protection for the isolated pilot control signal from the power lines of the EVSE. The amplification unit 208 includes an amplifier 304 and a transient voltage suppression diode (TVS) 306. The amplification unit 208 also includes resistors R3, R4, R5, R8, R9, R10, and R11, capacitor C3, and inductor L1. Resistors R8 and R11 are electrically connected to output pins of the optocoupler 302 and are arranged as a voltage divider between voltage sources (e.g., without limitation, 3V and −12V). One of the voltage sources may be the high precision isolated voltage generated by the precision isolated voltage generation unit 206. Point 308 is located between the resistors R8 and R11 and the voltage a point 308 is amplified by the amplifier 304.

The resistor R10 is electrically connected between point 308 and a non-inverting input of the amplifier 304. The resistor R3 and the capacitor C3 are electrically connected in parallel between the inverting input of the amplifier 304 and the output of the amplifier 304. The resistor R4 is electrically connected between the inverting input of the amplifier 304 and ground. The resistor R9 is electrically connected to the output of the amplifier 304. Together, the amplifier 304, resistors R3 and R4, and capacitor C3 form an amplifier circuit. The resistor R5 and the inductor L1 are electrically connected in parallel with each other between the resistor R9 and the output of the amplification unit 208. The TVS 306 is electrically connected between the output of the amplification unit 208 and ground. Together, the resistor R5, the inductor L1, and the TVS 306 form a conditioning circuit that conditions the output of the amplifier circuit.

The output of the amplification unit 208 is a pilot signal that is high precision and isolated from the power lines of the EVSE. In some example embodiments of the disclosed concept, when the pilot control signal is in the "LOW" state, the switch 300 is on and the voltage at point 308 is an isolated −12V. In this state, the output of the amplifier 304 and the pilot signal is a −12V isolated voltage.

In some example embodiments of the disclosed concept, when the pilot control signal is in the "HIGH" state, the switch 300 is off. In this state, the resistors R8 and R11 receive and divide the isolated voltage received from the precision isolated voltage generating unit 202. The divided isolated voltage is output at point 308. In some example embodiments of the disclosed concept, the resistors R8 and R11 are high precision resistors and the divided isolated voltage at point 308 is a high precision voltage which is amplified by the amplifier circuit to a high precision 12V signal. In this case, the output of the amplification unit 208 is a pilot signal that is a high precision 12V and is isolated from the power lines of the EVSE.

Figure 4:
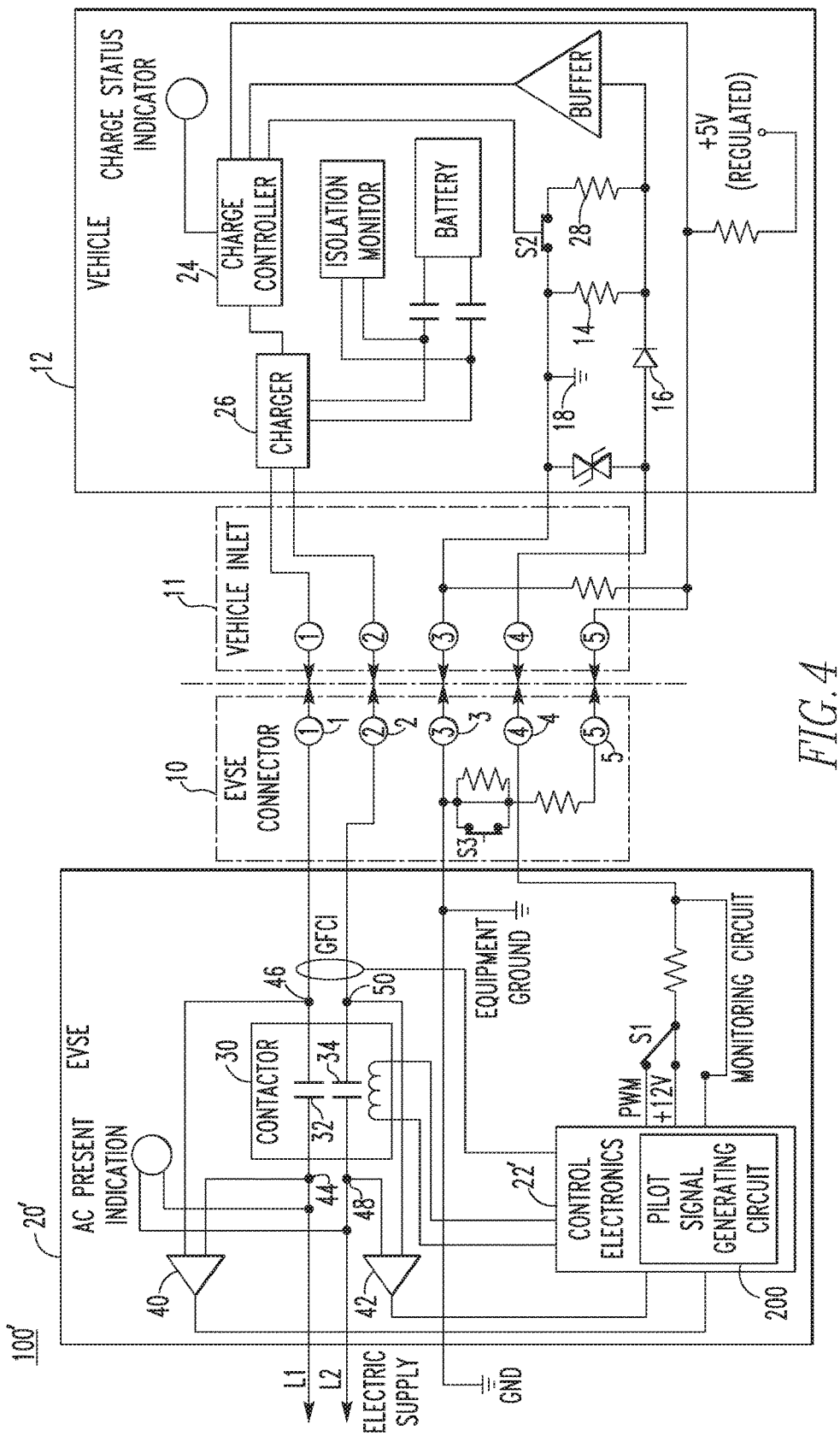
FIG. 4 is a block diagram in schematic form of an EVSE to EV system including a pilot signal generating circuit in accordance with an example embodiment of the disclosed concept.

Referring to FIG. 4, an EVSE to EV system 100' in accordance with an example embodiment of the disclosed concept is shown. The EVSE to EV system 100' of FIG. 4 is similar to the EVSE to EV system 100 of FIG. 1. However, the EVSE to EV system 100' of FIG. 4 employs the pilot signal generating circuit 200 in accordance with example embodiments of the disclosed concept. The pilot signal generating circuit 200 may be incorporated in the control electronics 22' of the EVSE 20', as is shown in FIG. 4. However, it will be appreciated by those having ordinary skill in the art that the pilot signal generating circuit 200 may be disposed in other elements of the EVSE 20' without departing from the scope of the disclosed concept. The EVSE to EV system 100' with the pilot generating circuit 200 is capable of providing a high precision pilot signal that is isolated from power lines of the EVSE 20'.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical circuit for electric vehicle supply equipment, the electrical circuit comprising:
    a power supply unit structured to generate an isolated voltage that is isolated from power lines of the electric vehicle supply equipment;

a pilot control signal unit structured to generate a pilot control signal having a state including one of a high state and a low state;
a pilot control signal isolation unit structured to generate an isolated pilot control signal that is isolated from the power lines of the electric vehicle supply equipment and is based on the state of the pilot control signal; and
an amplification unit structured to generate a pilot signal based on the state of the pilot control signal,
wherein the amplification unit is structured to receive the isolated pilot control signal and the isolated voltage and to use the isolated pilot control signal and the isolated voltage to generate the pilot signal, and wherein the pilot signal is isolated from the power lines of the electric vehicle supply equipment.

2. The electrical circuit of claim 1, wherein the pilot control signal isolation unit includes an optocoupler structured to provide isolation for the isolated pilot control signal from the power lines of the electric vehicle supply equipment.

3. The electrical circuit of claim 2, wherein the optocoupler provides at least 6 kV of surge protection between the isolated pilot control signal and the power lines of the electric vehicle supply equipment.

4. The electrical circuit of claim 2, wherein the pilot control signal isolation unit further includes a switch structured to turn on when the pilot control signal has the low state and to turn off when the pilot control signal has the high state.

5. The electrical circuit of claim 4, wherein the switch is a transistor including a base, a common, and an emitter, wherein the pilot control signal isolation unit further includes a first resistor electrically connected to the pilot control signal unit, a second resistor electrically connected between the base and the emitter, and third and fourth resistors electrically connected in parallel between the common and the optocoupler.

6. The electrical circuit of claim 1, wherein the amplification unit further includes first and second resistors arranged as a voltage divider electrically connected to outputs of the a pilot control signal isolation unit.

7. The electrical circuit of claim 6, wherein the voltage divider is structured to receive the isolated voltage and to divide the isolated voltage when the pilot control signal has the high state.

8. The electrical circuit of claim 6, wherein the first and second resistors are high precision resistors.

9. The electrical circuit of claim 6, wherein the amplification unit includes an amplifier circuit structured to receive and amplify an output of the voltage divider.

10. The electrical circuit of claim 9, wherein the output of the amplifier circuit is −12V when the pilot control signal has the low state and 12V when the pilot control signal has the high state.

11. The electrical circuit of claim 9, wherein the amplifier circuit includes an amplifier having a non-inverting input, an inverting input, and an output, a third resistor electrically connected between the voltage divider and the non-inverting input, a fourth resistor electrically connected between the inverting input and ground, and a fifth resistor and capacitor electrically connected in parallel between the inverting input and the output of the amplifier.

12. The electrical circuit of claim 9, wherein the amplification unit includes a conditioning circuit structured to condition the output of the amplification circuit and to output the pilot signal.

13. The electrical circuit of claim 12, wherein the conditioning circuit includes a sixth resistor and an inductor electrically connected in parallel, and wherein the conditioning circuit includes a transient voltage suppression diode electrically connected to ground.

14. The electrical circuit of claim 1, wherein when the pilot control signal has the low state, the isolated pilot control signal is −12V and the pilot signal is −12V.

15. The electrical circuit of claim 1, wherein when the pilot control signal has the high state, the isolated pilot control signal is 3V and the pilot signal is 12V.

16. The electrical circuit of claim 1 wherein when the pilot control signal has the high state, the pilot signal is a high precision 12V.

17. Electric vehicle supply equipment comprising:
power lines structured to carry power to charge an electric vehicle; and
a pilot signal generating circuit including:
    a power supply unit structured to generate an isolated voltage that is isolated from the power lines;
    a pilot control signal unit structured to generate a pilot control signal having a state including one of a high state and a low state;
    a pilot control signal isolation unit structured to generate an isolated pilot control signal that is isolated from the power lines and is based on the state of the pilot control signal; and
    an amplification unit structured to generate a pilot signal based on the state of the pilot control signal,
    wherein the amplification unit is structured to receive the isolated pilot control signal and the isolated voltage and to use the isolated pilot control signal and the isolated voltage to generate the pilot signal, and wherein the pilot signal is isolated from the power lines.

18. The electric vehicle supply equipment of claim 17, wherein the pilot control signal isolation unit includes an optocoupler structured to isolate the pilot control signal from the power lines of the electric vehicle supply equipment.

19. The electric vehicle supply equipment of claim 18, wherein the optocoupler provides at least 6 kV of surge protection between the isolated pilot control signal and the power lines of the electric vehicle supply equipment.

20. The electric vehicle supply equipment of claim 17, wherein the amplification unit further includes first and second resistors arranged as a voltage divider electrically connected to outputs of the pilot control signal isolation unit, and wherein the voltage divider is structured to receive the isolated voltage and to divide the isolated voltage when the pilot control signal has the high state.

21. The electric vehicle supply equipment of claim 20, wherein the first and second resistors are high precision resistors.

* * * * *